United States Patent
Wimmer et al.

(10) Patent No.: US 9,182,759 B2
(45) Date of Patent: Nov. 10, 2015

(54) DEVICE FOR THE AUTOMATED DRIVING OF A MOTOR VEHICLE, MOTOR VEHICLE HAVING SUCH A DEVICE AND METHOD FOR OPERATING A MOTOR VEHICLE

(71) Applicant: AUDI AG, Ingolstadt (DE)

(72) Inventors: Martin Wimmer, Regensburg, DE (US);
Juergen Meurle, Ingolstadt (DE); Heike Sacher, Munich (DE); Karl-Heinz Siedersberger, Koenlgsmoos (DE);
Fabian Scheiffert, Weinstadt (DE);
Franziska Ehrhart, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/377,136

(22) PCT Filed: Jan. 31, 2013

(86) PCT No.: PCT/EP2013/000285
§ 371 (c)(1),
(2) Date: Aug. 6, 2014

(87) PCT Pub. No.: WO2013/117307
PCT Pub. Date: Aug. 15, 2013

(65) Prior Publication Data
US 2015/0006013 A1    Jan. 1, 2015

(30) Foreign Application Priority Data

Feb. 6, 2012 (DE) .......................... 10 2012 002 304

(51) Int. Cl.
*G05D 1/00*       (2006.01)
*B60W 50/14*     (2012.01)
(Continued)

(52) U.S. Cl.
CPC .............. *G05D 1/0088* (2013.01); *B60K 35/00* (2013.01); *B60K 37/06* (2013.01); *B60W 50/14* (2013.01);
(Continued)

(58) Field of Classification Search
CPC ............ B60T 2201/10; B62D 15/0285; B60K 2350/1004; G05D 1/0088; G06F 3/0484; G08G 1/00
USPC ............ 701/23, 300, 400, 117, 118; 340/933, 340/937, 907, 901
See application file for complete search history.

(56) References Cited

U.S. PATENT DOCUMENTS 5,691,471 A * 11/1997 Okazaki et al. ............ 73/504.04
5,956,016 A     9/1999 Kuenzner et al.
(Continued)

FOREIGN PATENT DOCUMENTS

DE     103 03 792 A1    8/2004
DE     103 41 846 A1    3/2005
(Continued)

OTHER PUBLICATIONS

International Search Report mailed May 31, 2013 for corresponding International Patent Application No. PCT/EP2013/000285.
(Continued)

*Primary Examiner* — Dalena Tran
(74) *Attorney, Agent, or Firm* — Staas & Halsey LLP

(57) ABSTRACT

A driver assistance system for the fully automated driving of a motor vehicle has a control device for generating control signals for actuators of the motor vehicle, which are designed to drive the motor vehicle. The control device forms a slave of a master-slave arrangement. A user interface of the device forms the master. The user interface receives as an input from a user, a selection of a driving maneuver that is to be performed by the slave and/or a driving parameter value for a driving parameter with respect to a driving maneuver which is currently carried out by the slave. After completion of the input, the user interface activates the slave as a function of the input. The user interface has a representation of the motor vehicle, arranged in a field, wherein an edge represents a maximum permissible change in the driving parameter value.

16 Claims, 3 Drawing Sheets

(51) Int. Cl.
*B60K 35/00* (2006.01)
*B60K 37/06* (2006.01)
*G06F 3/0484* (2013.01)
*B60W 50/16* (2012.01)
*B60W 50/00* (2006.01)

(52) U.S. Cl.
CPC ....... *G06F 3/0484* (2013.01); *B60K 2350/1004* (2013.01); *B60K 2350/1008* (2013.01); *B60K 2350/962* (2013.01); *B60W 50/16* (2013.01); *B60W 2050/0006* (2013.01)

(56) References Cited

U.S. PATENT DOCUMENTS 6,707,443 B2 * 3/2004 Bruneau et al. ............... 345/156
8,316,166 B2 * 11/2012 Grant et al. ..................... 710/73

FOREIGN PATENT DOCUMENTS

| | | |
|---|---|---|
| DE | 10 2007 029 033 A1 | 12/2008 |
| DE | 10 2007 029 034 A1 | 12/2008 |
| DE | 10 2009 010 121 A1 | 12/2009 |
| DE | 10 2008 055 876 A1 | 5/2010 |
| DE | 10 2010 022 433 A1 | 12/2011 |
| DE | 10 2012 002 304.9 | 2/2012 |
| EP | 0 796 756 A2 | 9/1997 |
| EP | 2 050 610 A1 | 4/2009 |
| EP | 2 340 976 A1 | 7/2011 |
| EP | 2013/000285 | 1/2013 |

OTHER PUBLICATIONS

Search Report issued Oct. 31, 2012 for corresponding German Patent Application No. 10 2012 022 304.9.
WIPO English language International Preliminary Report on Patentability for PCT/EP2013/000285, downloaded from WIPO website Jan. 14, 2015, 9 pages.

* cited by examiner

DEVICE FOR THE AUTOMATED DRIVING OF A MOTOR VEHICLE, MOTOR VEHICLE HAVING SUCH A DEVICE AND METHOD FOR OPERATING A MOTOR VEHICLE

CROSS REFERENCE TO RELATED APPLICATIONS

This application is based on and hereby claims priority to International Application No. PCT/EP2013/000285 filed on Jan. 31, 2013 and German Application No. 10 2012 002 304.9 filed on Feb. 6, 2012, the contents of which are hereby incorporated by reference.

BACKGROUND

The invention relates to a method and a device for the automated driving of a motor vehicle.

The expression "driving of the motor vehicle" encompasses firstly the steering of the motor vehicle (following a course of a road, orienting the motor vehicle within a lane, lane change maneuver), which is also designated as transverse driving, and secondly the control of the driving speed of the motor vehicle (acceleration, reduction of the driving speed, emergency braking, maintaining the driving speed), which is also designated as longitudinal driving.

A device of the type mentioned is known from DE 10 2010 022 433 A1. According to that, a driver assistance unit in a fully automatic assistance mode can perform the driving of the vehicle completely independently. During the journey, the driver of the motor vehicle then does not have to operate either the steering wheel or the pedals of the motor vehicle and can therefore devote his/her attention to other things for a comparatively long period of time, such as the operation of an infotainment system, for example.

Fully automatic driver assistance systems are useful for example in connection with driving the motor vehicle in a backup if the motor vehicle in stop-and-go traffic can be driven only very slowly, generally at walking speed, and this is also possible only at relatively long time intervals. With corresponding monitoring of the surroundings of the motor vehicle, it is likewise also conceivable to enable the fully automatic driving of a motor vehicle during other driving maneuvers, for instance when parking, or else even at higher speeds.

Even during the automated driving of the motor vehicle by said device, it must be made possible for a driver to be able to influence the driving, in order for example to be able to turn off at an exit with the motor vehicle if the driver has spontaneously decided to take a different journey route, or to drive with the motor vehicle offset with respect to a center line of a lane (so-called transverse offset) in order to be able to look past a vehicle ahead. The fundamentally different functioning of fully automated systems in comparison with systems of partial automation (which carry out e.g. exclusively a driving speed control) or manual driving calls for a distinguished form of human-machine communication. The tasks of the human in the fully automated control loop of driver, vehicle and environment move away from focusing on the primary driving task toward system monitoring tasks. For this purpose, the human must be afforded an overview of what driving maneuvers can currently be carried out by the fully automatic driver assistance system and what possibilities remain available to the driver for influencing the driving maneuver currently being performed.

SUMMARY

One potential object is to enable a clear operation of a driver assistance system which drives a motor vehicle in a fully automated fashion.

The inventors propose a driver assistance system designed to perform the transverse and longitudinal driving of the motor vehicle independently, in other words without the assistance of a driver, during a journey of the motor vehicle. For this purpose, the device has a control unit, for instance a controller comprising a microcontroller, by which control signals can be generated and used to activate actuators of the motor vehicle, which are designed for driving the motor vehicle. Such actuators can be an electrically controllable servo steering system, an electrically controllable braking system and similar components known from the field of drive-by-wire systems. In the proposed device, the control unit forms a slave in a master-slave arrangement. In this case, the associated master is formed by a user interface of the device. This means that the user interface activates the slave and can thereby influence the driving behavior of the slave. For this purpose, the user interface receives an input from a user. Said input can be a selection of a driving maneuver to be performed by the slave and/or a value for a driving parameter with respect to a driving maneuver currently being performed by the slave. In this regard, provision can be made, for example, for the user to select via the user interface as driving maneuver: overtaking a vehicle ahead, turning, parking the motor vehicle in a parking space, or changing a lane. As a driving parameter which can be set by the user interface, a distance to a vehicle ahead, a transverse offset of the motor vehicle within a lane in which the motor vehicle is currently travelling, or a set speed (setpoint speed) of driving speed control can be provided, for example. Once the input by the user has ended, the user interface as master then activates the control unit as the slave in a manner dependent on said input. It can optionally be provided that the user must additionally confirm the input at the user interface before the user interface activates the slave. In contrast to the drive-by-wire concept, therefore, the driver does not drive the motor vehicle himself/herself by operating the user interface. The driver merely effects an input expressing the driving desire of said driver, such that the actual control sequence and coordination of transverse and longitudinal for implementing the driving desire is performed completely by the slave.

In order that the user can then select available driving maneuvers and/or set an expedient value for the driving parameter in a clear manner, the user interface is configured in a special way. It comprises firstly a representation of the motor vehicle and secondly a field in which this representation is arranged. In this regard, the user interface can have for this purpose, for instance, a graphical display unit (e.g. a screen), on which the motor vehicle is represented by an image or a symbol. This representation is situated in a field. In this case, an edge of the field makes it clear to the user what changes in a driving parameter value are maximally permissible. By way of example, if the vehicle is travelling in a lane of a multilane road and a further vehicle is situated in front of the motor vehicle, then a right edge and a left edge of the field can in each case symbolize a lane edge and an upper edge of the field displayed in front of the representation of the motor vehicle can symbolize the vehicle ahead. If the user then reorients the representation of the motor vehicle within the field by a corresponding operating element, this has the consequence that the control unit performs a corresponding change in the position of the motor vehicle within the lane. In order that a corresponding reaction of the slave (i.e. of the control unit) is not initiated every time the operating element is briefly tapped, provision can be made here for the tracking of the position of the motor vehicle adjusted by the slave to begin only once the position of the representation of the motor vehicle is still maintained by the user after a latency. This would then correspond to the already mentioned confirmation of the input by the user.

The user interface need not necessarily be a graphical display unit. The motor vehicle can also be represented more abstractly e.g. by a handle such as a control lever, for instance. In order that the user when operating the control lever is then given an impression of what driving parameter values the user can set, the user interface is then designed, by activating an actuator, for example an electric motor, to generate a force-displacement characteristic curve for a deflection of the handle and thereby, as it were, to haptically communicate the edge of the field of the possible driving parameter values to the user when said user deflects the handle. Such a user interface has the advantage that the driver, when operating it, does not have to look away from the surrounding road traffic.

Besides the already described possibility of setting the driving parameter by shifting the representation of the motor vehicle within the field it is also possible to use the same user interface to enable the user to select a driving maneuver to be performed. This is expediently made possible by a user shifting the representation of the motor vehicle beyond the edge of the field. By way of example, if a driver would like to change to a lane situated next to the motor vehicle on the left, then the driver, on a graphical display, can therefore shift the motor vehicle symbol e.g. firstly to the left edge of the field and then beyond that.

In order that the user can be given a direct impression of the consequences of his/her input, provision can also be made for carrying out the tracking of the position of the motor vehicle adjusted by the slave in real time.

Since the edge of the field of the user interface represents the maximum permissible change in a driving parameter value, a course of the edge must always be adapted to the actual conditions, that is to say for example to the lane width or whether or not a vehicle is actually travelling ahead of the motor vehicle. Expediently, for this purpose the user interface is designed to define the edge of the field in a manner dependent on a position of objects identified in the surroundings of the motor vehicle by an identification unit, that is to say in a manner dependent on an identified lane marking and/or an identified vehicle ahead. In addition or as an alternative thereto, provision can be made for defining the course of the edge in a manner dependent on information concerning traffic control, that is to say for instance a prescribed maximum speed along the current route of the motor vehicle.

As already mentioned, the device does not realize a drive-by-wire-system, since such a system always provides a direct coupling between the user's input and the actuators for driving the motor vehicle. Accordingly, the device gives rise to greater flexibility when implementing the driver's wish expressed by the driver. In this regard, one embodiment of the device provides for the slave, in a manner dependent on information concerning objects identified in the surroundings of the motor vehicle, to decide independently of the master whether and when it will drive the motor vehicle in accordance with the control data received from the master. Therefore, if the driver selects a specific driving maneuver that is intended to be performed by the slave, then the slave, after receiving the corresponding control data, can firstly wait for a favorable opportunity for performing said driving maneuver and only then initiate the necessary changes. In the meantime the driver himself/herself does not have to constantly pay attention to when the opportunity arises. This results in a considerable relief of the burden on the driver. By decoupling the input of the driver's wish from the actual, independent implementation by the slave, it is also possible, moreover, to increase the safety of the motor vehicle occupants by virtue of the fact that the driver's wish is implemented only in correspondingly safe situations.

The device is very flexibly configurable in connection with the reception of a user input. In this regard, the user input can be received via a touch-sensitive surface, for example of a touch-screen (touch-sensitive screen), or via a control lever. Use of a gesture control facility and/or of a voice control facility is also possible without any problems.

Overall, therefore, in summary the device makes it possible to carry out the following method proposed by the inventors. A representation of the motor vehicle and the selectable driving maneuvers that can be performed by the control unit and/or the possible driving parameter values with respect to a driving maneuver currently being performed are presented at the user interface. With respect to the driving maneuvers and/or the driving parameters, an input from a user is then received by the user interface. By said input, however, the user does not control the motor vehicle in the sense of a drive-by-wire system. Instead, by said input, the user specifies what driving maneuver is to be performed in the near future without the assistance of the user and/or what value of a driving parameter, that is to say for example what distance to the verges of a lane or to a vehicle ahead, is to be adjusted without the further assistance of the user. By the user interface, corresponding control data are then generated and transmitted to the control unit, which drives the motor vehicle independently. The control unit then changes the driving of the motor vehicle in accordance with the control data if a predetermined criterion concerning surroundings of the motor vehicle is fulfilled, that is to say for instance an overtaking lane is free, in order to be able to overtake a vehicle ahead, or a predefined transverse offset of the motor vehicle in the lane does not lead to the driver's safety being jeopardized.

In connection with the proposed method, the proposal also encompasses developments of this method which have features corresponding to the features already described in connection with proposed the device. Therefore, these developments of the method will not be described again.

The inventors furthermore proposed a motor vehicle into which an embodiment of the device is incorporated.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
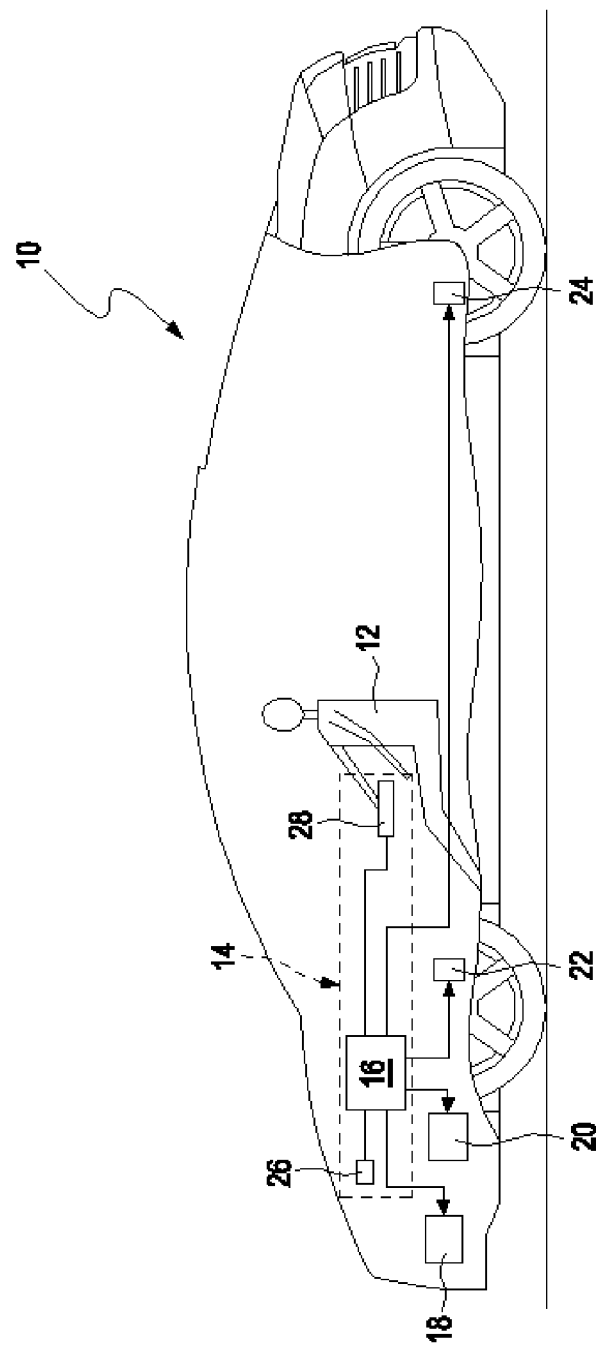
FIG. 1 shows a schematic illustration of a potential embodiment for the proposed motor vehicle.

Reference will now be made in detail to the preferred embodiments of the present invention, examples of which are illustrated in the accompanying drawings, wherein like reference numerals refer to like elements throughout.

FIG. 1 shows a motor vehicle 10 with a driver 12 situated therein. The motor vehicle 10 can be a car, for example. For the following explanation it will be assumed that the motor vehicle 10 is in a driving situation in which the driving of the motor vehicle 10 requires many different driving processes. In this regard, the motor vehicle 10 may be in a backup, for example, in which it makes progress only in stop-and-go traffic. Accordingly, the motor vehicle 10 has to be accelerated and decelerated again in an alternating sequence. At the same time it will be assumed that this driving situation is very monotonous. The burden on the driver 12 is relieved significantly in this driving situation. The driver neither has to concentrate fully on the traffic the entire time nor has to operate the pedal controls and the steering wheel of the motor vehicle 10 the entire time. This is because the motor vehicle 10 is driven completely by a driver assistance system 14 (complete longitudinal and transverse driving). For this purpose, the driver assistance system 14 has a control unit 16, which controls an engine control unit 18, an electromechanical steering system 20 and brakes 22, 24 of the motor vehicle 10. Besides the control unit 16, the driver assistance system 14 also includes a monitoring unit 26, which can comprise a radar and a camera, for example, by which the surroundings of the motor vehicle 10 are observed. The control unit 16 drives the motor vehicle 10 in accordance with a predefinition formed by values of driving parameters. By way of example, the control unit 16 maintains a predefined setpoint distance from a vehicle ahead and from lane lines situated at the lane edge on both sides of the motor vehicle 10. In this case, the control unit 16 adjusts the setpoint values in a manner dependent on data of the monitoring unit 26. The control unit 16 thus independently keeps the motor vehicle 10 in the lane in which the motor vehicle is currently travelling, to be precise either at the predefined setpoint distance from the vehicle ahead or else at a predefined setpoint speed if no vehicle ahead is identified by the monitoring unit 26.

The driver 12 can set the setpoint values via a user interface 28 of the driver assistance system 14. The user interface 28 can comprise, for example, a screen or else a touch-screen or a control lever or else a handle that can be deflected translationally in a plane perpendicular to the vertical axis of the vehicle. Via the user interface 28, it is also possible for the driver 12 to induce the control unit 16 to perform a different driving maneuver.

Figure 2:
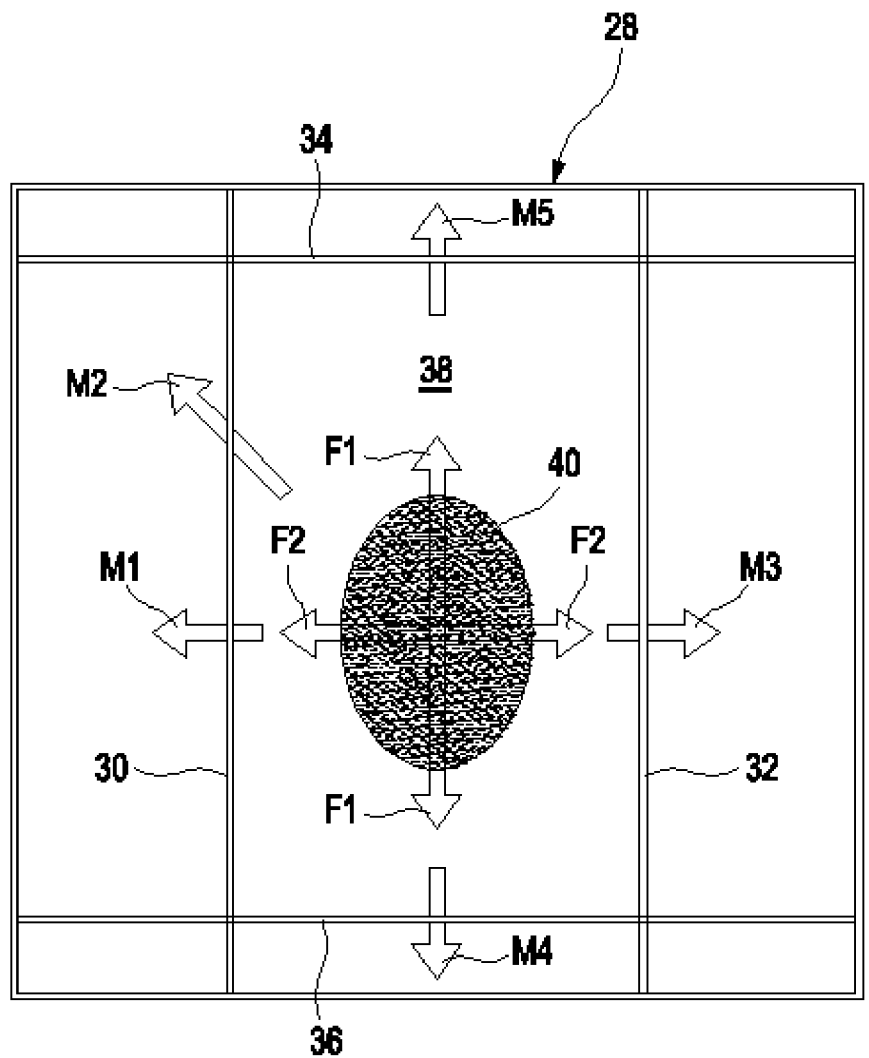
FIG. 2 shows a schematic construction of a user interface of a driver assistance system of the motor vehicle from FIG. 1.

The user interface 28 and the control unit 16 form a master-slave arrangement, wherein the user interface 28 constitutes the master and the control unit 16 constitutes the slave. The user interface 28, i.e. the master, presents a miniature of the controlled system, that is to say the setpoint values of the position or driving speed of the motor vehicle 10 that are to be adjusted by the slave (the control unit 16). The operating concept allows the user, that is to say the driver 12, by the model-based, abstracted mapping of the controlled system in the form of the user interface 28, to adapt driving parameters with respect to the driving maneuver currently being performed and also to trigger a new driving maneuver, i.e. to initiate the performance thereof, without in this case having to perform the maneuver himself/herself. By the realization as a master-slave arrangement, the symbolic projection of the motor vehicle onto the user interface is realized, as are restrictions that arise when setting driving parameter values or selecting driving maneuvers on account of the current conditions of the surroundings of the motor vehicle 10. These restrictions are also presented to the driver 12 in an abstracted manner via the user interface 28. As illustrated in FIG. 2, the lane markings 30, 32 of the own lane of the motor vehicle 10 and, if appropriate, control-relevant vehicles 34 ahead and respectively a vehicle 36 behind are represented in the abstracted presentation. The presentation of further restrictions as a result of conditions of the surroundings, for example a speed limit, is also conceivable. The degree of abstraction of this presentation can vary in this case. This information can be communicated to the driver 12 via various human sensory channels individually or in combination, that is to say acoustically, haptically, visually and tactilely, to mention only the most important examples.

A field 38 is formed by the boundaries represented on the user interface 28. In the field 38, there is a representation 40 of the motor vehicle 10 at a location corresponding to the current position of the motor vehicle 10 in its own lane in relation to the vehicle ahead (representation 34), the lane lines (representations 30, 32) and the vehicle behind (representation 36).

The driver 12 can adapt the values of the driving parameters of the control unit 16 concerning the position of the motor vehicle 10 in its own lane by the driver deflecting the representation 40 within the field 38. In this regard, a driving parameter F1 (distance to the vehicle ahead or increasing the setpoint driving speed) can be attained by shifting the representation 40 to the boundary 34 located in front of the representation 40. The distances to the lane edges are set as a driving parameter F2 by laterally shifting the representation 40 within the field 38. The driving parameters F1 and F2 give rise to a predefinition for the transverse offset of the motor vehicle 10 within its own lane and an adaptation of the setpoint time gap (setpoint distance) with respect to the vehicle ahead. The user interface 28, i.e. the master of the operating concept, transmits the desired values predefined by the driver 12 by the positioning of the representation 40 as control data to the control unit 16. The reaction of the control unit 16, that is to say of the slave, then follows the position change of the master. The tracking of the slave position can either be realized by maintaining the master position and beginning the reaction after a latency, or the slave position is adapted to the master position in real time.

Via the user interface 28, the driver 12 can also be able to initiate a new driving maneuver, that is to say e.g. a change of lane or maneuvering the motor vehicle into a parking space. For this purpose, corresponding driving maneuvers are predefined in the user interface 28. For the explanation of possible driving maneuvers, it will be assumed below in connection with FIG. 2 that the motor vehicle 10 is situated in the outer right lane of a multilane roadway. A first possible driving maneuver M1 presented for selection to the driver 12 by the user interface 28 is a lane change to the adjacent left lane. A further driving maneuver M2 is formed by a maneuver of overtaking the vehicle ahead. In order to turn off the roadway and to drive for example from an expressway to an exit, a turning maneuver as further driving maneuver M3 has to be initiated by the driver 12. Stopping the motor vehicle 10 forms a fourth driving maneuver M4. In order, with a free roadway, to accelerate the motor vehicle 10 as fast as possible (so-called kick-down function), a corresponding acceleration maneuver (driving maneuver M5) has to be triggered by the driver 12. In a different context, the initiation of the driving maneuver M5 can also constitute a so-called starting confirmation, i.e. the driver 12, after the motor vehicle 10 has been independently stopped by the control unit 16, must first confirm that the control unit 16 is permitted to start the motor vehicle 10 moving again.

A driving maneuver implies leaving the barriers 30, 32, 34, 36 that restrict the slave (the control unit 16). The relevant lane is intended to be left and the control-relevant vehicle ahead (if present) is to be changed as a consequence. In order to communicate these consequences to the driver 12, the initiation or triggering of a driving maneuver via the user interface 28 is realized in the corresponding manner: the driver 12 has to overrule the virtual boundaries 30, 32, 34, 36, i.e. shift the representation 40 beyond the boundaries. In FIG. 2, in this respect, direction arrows for the corresponding driving maneuvers M1 to M5 indicate the directions in which the representation 40 is to be shifted in this case. The control unit 16 does not immediately implement the driving maneuver in this case. Rather, the control unit 16, on the basis of the data of the monitoring unit 26, checks whether the driving maneuver can be performed safely at all on account of appropriate conditions of the surroundings. If this is not possible within a predetermined time, the selected driving maneuver can lapse, i.e. the attempt to perform this driving maneuver is terminated. If an opportunity arises to perform the driving maneuver desired by the driver 12, then the control unit 16 initiates corresponding driving processes by activating the control unit 18, the steering system 20 or the brakes 22, 24 with corresponding control signals. During the performance of the driving maneuver and after the ending thereof, the virtual boundaries 30, 32, 34, 36 as presented to the driver 12 via the user interface 28 are then adapted to the resulting new driving situation.

The state of the controlled system of motor vehicle, i.e. the identified conditions of the surroundings, and the position of the motor vehicle 10 within the surroundings, can be communicated to the driver 12 by different modalities.

In this regard, the user interface 28 illustrated in FIG. 2 can be realized in the form of a touch-screen on which the boundaries 32 to 36 of the field 38 and the representation 40 are displayed. A screen and an operating unit, for example a control lever, separate from said screen can also be provided. By way of example, it is possible to position an operating element in the center console of the motor vehicle 10 and a screen in the head-up display and/or in the combination instrument. In this case, the master vehicle (representation 40) and its crucial surroundings can then be advantageously visualized in different degrees of abstraction. Video-realistic presentations are conceivable like highly abstracted, symbolic forms of presentation.

Figure 3:
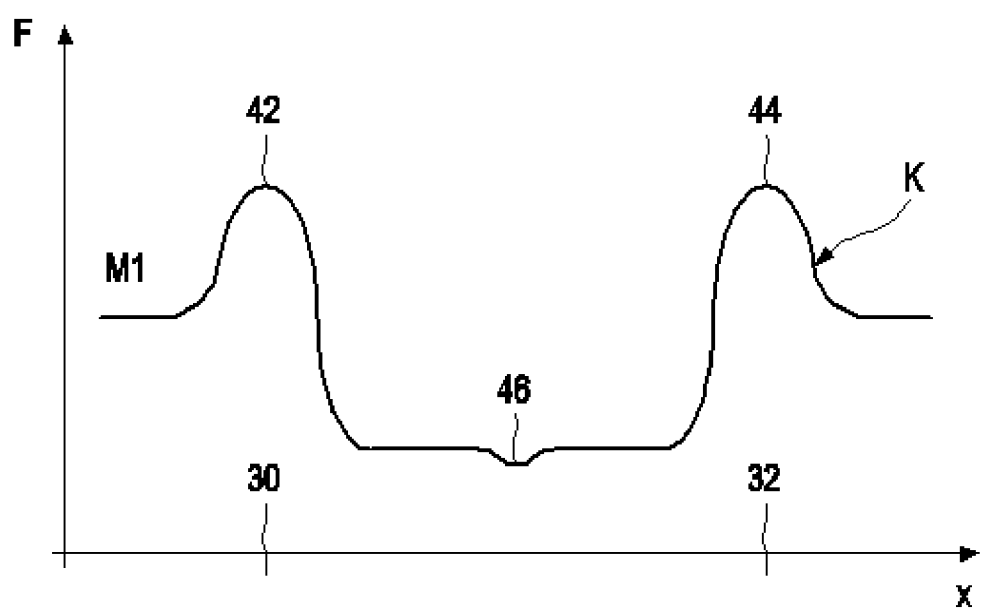
FIG. 3 shows a diagram with a schematic profile of a force-displacement characteristic curve which can be set on a handle of the driver assistance system of the motor vehicle from FIG. 1.

In addition or as an alternative to a visual presentation, a haptic presentation can also serve as a communication medium. A correspondingly configured operating element then communicates the boundaries 30 to 36 as a force-displacement characteristic curve by an actuator (e.g. an electric motor) to, for example, a hand of the driver 12 which operates the operating element. Such a handle then corresponds to the representation 40 in FIG. 2. A suitable operating element is, for example, a control lever with corresponding actuators or a translationally displaceable body on the center console. FIG. 3 illustrates an exemplary profile of a force-displacement characteristic curve K such as can be generated for haptically communicating the edges 30, 32 of the field 38 on a handle. Along an x-direction perpendicular to the direction of travel in the current lane, the boundary 30 given by the left lane edge is represented by a force maximum 42 and the right lane edge, i.e. the boundary 32, is correspondingly represented by a force maximum 44. If the driver 12 then deflects the handle transversely with respect to the direction of travel, i.e. in the x-direction, the driver, in accordance with the profile of the restoring force F of the handle, said profile being shown in terms of absolute value in FIG. 3, feels that the handle opposes said driver with an ever greater force upon approaching the boundary 30 or 32. In this case, by way of example, if the driver overcomes the force maximum 42, then the driver thereby initiates the driving maneuver M1. A force dip 46 between the boundary 30 and the boundary 32 indicates to the driver 12 where the center of the lane is situated (transverse offset=0). An additional haptic feedback is possible by a force feedback, for example by vibration of the adjusting part.

The user interface can be configured more simply if the input from the driver 12 is implemented directly by the control unit 16, such that the driver, by looking out of the vehicle, recognizes where the motor vehicle 10 is being guided by control.

Further embodiments enable communication of the edges of the field 38 by the user interface 28 and this can be conveyed on the basis of movements, and gesture-based operation or operation by voice input can be made possible here for the driver 12.

The examples show how the integration of the master-slave principle into an operating concept for fully automated driver assistance functions affords the possibility of realizing a user-oriented interface design for future driver assistance systems. Firstly, the internal modeling of the current driving situation and of the properties of the driver assistance system is simplified for the driver by the communication via the user interface. In addition, the driver receives more information about the motor vehicle system, from which the driver is actually decoupled by virtue of the fully automatic operation. In the case of a take-over request by the driver assistance system, if the latter for example recognizes a situation in which automated driving is impossible, a higher quality of the take-over of driving of the vehicle by the driver can be expected, i.e. the driver is more rapidly aware of how the driver himself/herself has to manually drive the vehicle in order to maneuver it into a safe state again.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A device for automated driving of a motor vehicle, comprising:
    actuators to drive the motor vehicle;
    a control unit to generate control signals for the actuators, to carry out transverse and longitudinal driving of the motor vehicle independently during a journey of the motor vehicle, the control unit acting as a slave in a master-slave arrangement; and
    a user interface acting as a master in the master-slave arrangement, to receive an input from a user and to activate the slave in a manner dependent on the input, the input comprising a selection of a new driving maneuver to be performed by the slave and/or a driving parameter to alter a driving maneuver currently being performed by the slave, wherein
    the user interface comprises a representation of the motor vehicle, the representation of the motor vehicle being configured as a handle, an image or a symbol arranged in a field, the field having an edge that represents a maximum permissible change in the driving parameter, and
    the user interface receives the input from the user such that shifting the representation of the motor vehicle within the field sets the driving parameter and shifting the representation of the motor vehicle beyond the edge of the field selects the driving maneuver.

2. The device as claimed in claim 1, wherein
the driving maneuver is selected from at least two potential maneuvers comprising overtaking a vehicle ahead, turning, parking the motor vehicle in a parking space, changing a lane, starting the motor vehicle, performing a kick-down acceleration, and stopping the motor vehicle.

3. The device as claimed in claim 1, wherein the driving parameter is input to alter at least one of a distance to a vehicle ahead, a transverse offset of the motor vehicle from an edge of a lane in which the motor vehicle is currently travelling, and a set speed of a driving speed control.

4. The device as claimed in claim 1, wherein
the user interface is a display device, and
the representation of the motor vehicle and the edge of the field are graphically displayed on the display device.

5. The device as claimed in claim 4, wherein the user interface comprises a touch-screen.

6. The device as claimed in claim 1, wherein
the user interface represents the motor vehicle by a handle, and
the user interface has an actuator to generate a force-displacement characteristic curve for a deflection of the handle to thereby haptically communicate the edge of the field to the user while the user deflects the handle.

7. The device as claimed in claim 1, wherein acting as the slave, the control unit generates control signals to modify driving of the motor vehicle to alter the driving maneuver currently being performed and/or to switch to a new driving maneuver, thereby tracking a change in position of the representation of the motor vehicle.

8. The device as claimed in claim 7, wherein driving is modified only after a new position of the representation of the motor vehicle has been maintained by the user for a latency period.

9. The device as claimed in claim 7, wherein driving is modified only after the user confirms validity of the input at the user interface.

10. The device as claimed in claim 1, wherein the user interface positions the representation of the motor vehicle with respect to the edge of the field in a manner dependent on at least one of:
a position of the motor vehicle with respect to an object along a route, the object being selected from the group consisting of a lane marking and a vehicle ahead, and information concerning traffic control.

11. The device as claimed in claim 10, wherein the information concerning traffic control is a prescribed maximum speed.

12. The device as claimed in claim 10, wherein the object along the route is identified in a vicinity of the motor vehicle by an identification unit of the motor vehicle.

13. The device as claimed in claim 1, wherein
the slave identifies objects in a vicinity of the motor vehicle, and
the slave decides independently of the master, based on the objects in the vicinity of the motor vehicle, whether and when it will modify driving of the motor vehicle in accordance with the input from the user.

14. The device as claimed in claim 1, wherein the user interface comprises at least one of a gesture recognition device and a voice recognition device.

15. A motor vehicle, comprising a device as claimed in claim 1.

16. A method for operating a motor vehicle, comprising:
providing a user interface to present a field and to present a representation of the motor vehicle in the field, the field having an edge;
using the representation of the motor vehicle in the field to present potential driving maneuvers and to present potential driving parameter values to alter a driving maneuver currently being performed;
receiving an input from a user at the user interface, the input specifying a new driving maneuver to be performed or specifying a selected driving parameter value to alter the driving maneuver currently being performed;
generating control data in a manner dependent on the input and transmitting the control data to a control unit; and
independently, without assistance of the user, changing driving of the motor vehicle by the control unit in accordance with the control data if a predetermined criterion concerning surroundings of the motor vehicle is fulfilled, wherein
the user interface receives the input from the user such that shifting the representation of the motor vehicle within the field specifies the selected driving parameter value and shifting the representation of the motor vehicle beyond the edge of the field selects the new driving maneuver.

* * * * *

UNITED STATES PATENT AND TRADEMARK OFFICE
CERTIFICATE OF CORRECTION

PATENT NO. : 9,182,759 B2  
APPLICATION NO. : 14/377136  
DATED : November 10, 2015  
INVENTOR(S) : Martin Wimmer et al.

It is certified that error appears in the above-identified patent and that said Letters Patent is hereby corrected as shown below:

ON THE TITLE PAGE

Item (72) Inventors, Line 4

Delete "Koenlgsmoos, (DE);" and insert --Koenigsmoos, (DE);--, therefor.

Signed and Sealed this
Seventeenth Day of May, 2016

Michelle K. Lee
*Director of the United States Patent and Trademark Office*